United States Patent
Yokouchi et al.

(10) Patent No.: US 6,731,497 B2
(45) Date of Patent: May 4, 2004

(54) SOLID ELECTROLYTIC CAPACITOR AND METHOD FOR MANUFACTURING THE SAME

(75) Inventors: Yumiko Yokouchi, Tokyo (JP); Masaaki Kobayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/192,745

(22) Filed: Jul. 10, 2002

(65) Prior Publication Data

US 2003/0107870 A1 Jun. 12, 2003

(30) Foreign Application Priority Data

Jul. 11, 2001 (JP) ......................................... 2001-210218

(51) Int. Cl.$^7$ ................................................ H01G 9/02
(52) U.S. Cl. ...................................... 361/525; 252/62.2
(58) Field of Search ................................ 361/523–541; 252/62.2

(56) References Cited

U.S. PATENT DOCUMENTS

| | | | |
|---|---|---|---|
| 4,910,645 A | 3/1990 | Jonas et al. | 361/525 |
| 5,187,650 A | 2/1993 | Kudoh et al. | 361/525 |
| 5,812,367 A * | 9/1998 | Kudoh et al. | 361/523 |
| 5,914,852 A | 6/1999 | Hatanaka et al. | 361/523 |
| 6,001,281 A | 12/1999 | Lessner et al. | 252/500 |
| 6,136,176 A | 10/2000 | Wheeler et al. | 205/328 |
| 6,206,937 B1 * | 3/2001 | Kudoh et al. | 29/25.03 |
| 6,430,032 B2 * | 8/2002 | Sakai et al. | 361/523 |

FOREIGN PATENT DOCUMENTS

| | | | | |
|---|---|---|---|---|
| JP | 1977-79255 | 7/1977 | | |
| JP | 1983-191414 | 11/1983 | | |
| JP | 1988-158829 | 7/1988 | | |
| JP | 1988-173313 | 7/1988 | | |
| JP | 06-310380 | 11/1994 | | |
| JP | 11-238648 | 8/1999 | | |
| JP | 11-238649 | 8/1999 | | |
| JP | 11-251192 | 9/1999 | | |
| JP | 11-251193 | 9/1999 | | |
| JP | 11-283875 | 10/1999 | | |
| JP | WO 99/67797 | * 12/1999 | ......... | H01G/9/028 |
| JP | 2000-100665 | 4/2000 | | |
| WO | WO 99/25753 | 5/1999 | | |

OTHER PUBLICATIONS

Kovacic. P. et al., "Polymerization of Benzene to p–Polyphenyl by Aluminum Chloride–Cupric Chloride[1]", *Department of Chemistry, Case Institute of Technology, Cleveland 6, Ohio*, vol. 85, pp. 454–458.

* cited by examiner

*Primary Examiner*—Dean A. Reichard
*Assistant Examiner*—Eric Thomas
(74) *Attorney, Agent, or Firm*—Seed IP Law Group PLLC

(57) ABSTRACT

A solid electrolytic capacitor is manufactured by repeating a plurality of times a first step of immersing a substrate made of a valve metal whose surface is roughened and which is formed with an insulating oxide film in an ethylene dioxythiophene solution and a second step of bringing the substrate into contact with an oxidizing agent solution containing quadrivalent cerium salt at a concentration of 1% to 7% by weight so that the cumulative total time during which the second step is performed is shorter than five minutes, thereby forming a solid high molecular polymer electrolyte layer on the surface of the substrate.

8 Claims, 3 Drawing Sheets

SOLID ELECTROLYTIC CAPACITOR AND METHOD FOR MANUFACTURING THE SAME

BACKGROUND OF THE INVENTION

The present invention relates to a solid electrolytic capacitor and a method for manufacturing a solid electrolytic capacitor and, particularly, to a solid electrolytic capacitor having an excellent leakage current characteristic and a method for manufacturing a solid electrolytic capacitor which can produce a solid high molecular polymer electrolyte layer comprising polyethylene dioxythiophene under a normal temperature and in a short time without damaging a valve metal substrate constituting an electrode and produce a solid electrolytic capacitor whose leakage current is low.

DESCRIPTION OF THE PRIOR ART

An electrolytic capacitor is conventionally formed by employing a so-called valve metal capable of forming an insulating oxide film such as aluminum, titanium, brass, nickel, tantalum or the like as an anode, anodizing the surface of the valve metal to form an insulating oxide film thereon, forming an electrolyte layer substantially serving as a cathode, and forming a conductive layer of graphite, silver or the like as a cathode.

For example, an aluminum electrolytic capacitor is formed by employing as an anode a porous aluminum foil whose specific surface area is increased by etching, and providing a separation paper impregnated with an electrolytic solution between an aluminum oxide layer formed on the surface of the anode and a cathode foil.

In general, although an electrolytic capacitor using an electrolytic solution for an electrolyte layer between an insulating oxide film and a cathode has the disadvantage that its lifetime is determined by liquid leakage, evaporation of the electrolytic solution and the like, a solid electrolytic capacitor using a solid electrolyte containing metal oxide or organic compounds does not have such a disadvantage and is preferable.

Manganese dioxide is a typical metal oxide usable for the solid electrolyte of a solid electrolytic capacitor. On the other hand, as an organic compound usable for the solid electrolyte of a solid electrolytic capacitor, 7,7,8,8-tetracyanoxydimenthane (TCNQ) complex salt disclosed in Japanese Patent Application Laid Open No. 58-191414 can be cited.

Recently, as the frequency of power circuits of electronic devices has become higher, corresponding performance is required of capacitors used therewith. However, a solid electrolytic capacitor using a solid electrolyte layer containing manganese dioxide or TCNQ complex salt has the following disadvantages.

Although a solid electrolyte layer containing manganese dioxide is generally formed by repeating thermal decomposition of manganese nitrate, an insulating oxide film is damaged or degraded by heat applied during thermal decomposition or oxidative effect of NOx gas generated during thermal decomposition. Therefore, in the case where a solid electrolyte layer is formed using manganese dioxide, leakage current becomes high, for example, and various characteristics of the capacitor finally obtained tend to be lowered.

Further, in the case where a solid electrolyte layer is formed using manganese dioxide, the solid electrolytic capacitor has the disadvantage that impedance thereof becomes higher in the high frequency region.

On the other hand, a solid electrolytic capacitor using TCNQ complex salt does not adequately satisfy the requirement for low impedance of current solid electrolytic capacitors, since the electric conductivity of TCNQ complex salt is about 1 S/cm or lower.

It has been further pointed out that the reliability of a solid electrolytic capacitor using TCNQ complex salt as a solid electrolyte is not sufficient for the reason that adhesive strength between TCNQ complex salt and an insulating oxide film is low and the thermal stability of TCNQ complex salt during soldering and with lapse of time is low, and the like. In addition, TCNQ complex salt is expensive and, therefore, the cost of a solid electrolytic capacitor using TCNQ complex salt as a solid electrolyte is high.

For solving these problems occurring when manganese dioxide or TCNQ complex salt is used as a solid electrolyte and obtaining a solid electrolytic capacitor having better characteristics, it has been proposed to use as a solid electrolyte a high molecular compound having high electric conductivity whose manufacturing cost is relatively low, whose adhesive strength to an insulating oxide film is relatively good and whose thermal stability is excellent.

For example, Japanese Patent No. 2,725,553 discloses a solid electrolytic capacitor in which polyaniline formed on an insulating oxide film on the surface of an anode by the chemical oxidation polymerization process.

Further, Japanese Patent Publication No. 8-31400 proposes a solid electrolytic capacitor in which a thin film of metal or manganese dioxide is formed on an insulating oxide film and a conductive polymer film of polypyrrole, polythiophene, polyaniline, polyfuran or the like is formed on the thin film of metal or manganese dioxide by the electrolysis polymerization process, for the reason that it is difficult to form a conductive polymer film having high strength on an insulating oxide film on the surface of an anode only by the chemical oxidation polymerization process and that it is impossible or extremely difficult to directly form an electrolysis polymerization film on an insulating oxide film on the surface of an anode by the electrolysis polymerization process because the insulating oxide film on the surface of an anode is a non-conductor.

Furthermore, Japanese Patent Publication No. 4-74853 proposes a solid electrolytic capacitor in which a conductive polymer film of polypyrrole, polythiophene, polyaniline, polyfuran or the like is formed on an insulating oxide film by the chemical oxidation polymerization process.

At present, polypyrrole and polyethylene dioxythiophene are widely used as polymers for forming a solid high molecular polymer electrolyte layer of a solid electrolytic capacitor. Among these, although polyethylene dioxythiophene has high thermal stability and preferable characteristics as a polymer for forming a solid high molecular polymer electrolyte layer, since there are few merits when producing it by the electrolysis polymerization process, polyethylene dioxythiophene is normally synthesized using the chemical oxidation polymerization process. However, when producing polyethylene dioxythiophene using the chemical oxidation polymerization process, since polyethylene dioxythiophene is hard to react under a normal temperature and the rate of polymerization thereof is low, it is necessary to heat the reaction system up to about 50 to 70 degrees (centigrade) to facilitate the reaction.

Moreover, since an oxidizing agent which is a strong acid is used and the polymerization reaction system including an electrode has to be heated, there is a high risk of materially damaging the electrode during the polymerization process. This lowers yield in an aging process and degrades the leakage current characteristic of the electrolytic capacitor.

Japanese Patent Application Laid Open No. 11-238648 proposes a method for forming a solid high molecular polymer electrolyte layer by alternately immersing a valve metal substrate formed with an insulating oxide film in a monomer solution for forming a conductive polymer compound and a solution of an aqueous solvent system oxidizing agent such as peroxodisulphuric acid, sodium salt thereof, potassium salt thereof, ammonium salt thereof; cerium (IV) nitrate, cerium (IV) nitrate ammonium; ferric sulfate, ferric chloride; or the like or a solution of an organic solvent system oxidizing agent such as ferric dodecyl benzene sulfonate, ferric p-toluene sulfonate or the like one to twenty times, preferably, three to ten times, each for five minutes to five hours, preferably, fifteen minutes to three hours.

Further, Japanese Patent Application Laid Open No. 11-238649 proposes a method for forming a solid high molecular polymer electrolyte layer by separately immersing a valve metal substrate formed with an insulating oxide film in a monomer solution for forming a conductive polymer compound and a solution of an aqueous solvent system oxidizing agent such as peroxodisulphuric acid, sodium salt thereof, potassium salt thereof, ammonium salt thereof; cerium (IV) nitrate, cerium (IV) nitrate ammonium; ferric sulfate, ferric chloride; or the like or a solution of an organic solvent system oxidizing agent such as ferric dodecyl benzene sulfonate, ferric p-toluene sulfonate or the like one to twenty times, preferably, three to ten times, each for five minutes to five hours, preferably, fifteen minutes to three hours, thereby performing the chemical oxidation polymerization in the oxidizing agent solution, or forming a solid high molecular polymer electrolyte layer by immersing a valve metal substrate formed with an insulating oxide film in a mixing solution of a monomer solution for forming a conductive polymer compound and an aqueous solvent system oxidizing agent such as peroxodisulphuric acid, sodium salt thereof, potassium salt thereof, ammonium salt thereof; cerium (IV) nitrate, cerium (IV) nitrate ammonium; ferric sulfate, ferric chloride; or the like or an organic solvent system oxidizing agent such as ferric dodecyl benzene sulfonate, ferric p-toluene sulfonate or the like, thereby performing the chemical oxidation polymerization in the mixing solution.

Furthermore, Japanese Patent Application Laid Open No. 11-251192 proposes a method for forming a solid high molecular polymer electrolyte layer by alternately immersing a valve metal substrate formed with an insulating oxide film in a monomer solution for forming a conductive polymer compound and an aqueous solution of an oxidizing agent such as peroxodisulphuric acid, sodium salt thereof, potassium salt thereof, ammonium salt thereof; cerium (IV) nitrate, cerium (IV) nitrate ammonium; ferric sulfate, ferric chloride; or the like one to twenty times, preferably, three to ten times, each for five minutes to five hours, preferably, fifteen minutes to three hours, thereby performing the chemical oxidation polymerization in the aqueous oxidizing agent solution.

Moreover, Japanese Patent Application Laid Open No. 11-251193 proposes a method for forming a solid high molecular polymer electrolyte layer by alternately immersing a valve metal substrate formed with an insulating oxide film in a monomer solution for forming a conductive polymer compound and an aqueous solution of an oxidizing agent such as peroxodisulphuric acid, sodium salt thereof, potassium salt thereof, ammonium salt thereof; cerium (IV) nitrate, cerium (IV) nitrate ammonium; ferric sulfate, ferric chloride; or the like, to at least one of which a surface active agent is added, one to twenty times, preferably, three to ten times, each for five minutes to five hours, preferably, fifteen minutes to three hours, thereby performing the chemical oxidation polymerization in the aqueous oxidizing agent solution.

Furthermore, Japanese Patent Application Laid Open No. 11-283875 proposes a method for forming a solid high molecular polymer electrolyte layer by alternately immersing a valve metal substrate formed with an insulating oxide film in a monomer solution for forming a conductive polymer compound and a solution of an aqueous solvent system oxidizing agent such as peroxodisulphuric acid, sodium salt thereof, potassium salt thereof, ammonium salt thereof; cerium (IV) nitrate, cerium (IV) nitrate ammonium; ferric sulfate, ferric chloride; or the like, or a solution of an organic solvent system oxidizing agent such as ferric dodecyl benzene sulfonate, ferric p-toluene sulfonate or the like, at least one of which particulate powders are added to, one to twenty times, preferably, three to ten times, each for five minutes to five hours, preferably, fifteen minutes to three hours, thereby performing the chemical oxidation polymerization in the mixing solution.

However, since the oxidizing agent solutions described in Japanese Patent Application Laid Open No. 11-238648, Japanese Patent Application Laid Open No. 11-238649, Japanese Patent Application Laid Open No. 11-251192, Japanese Patent Application Laid Open No. 11-251193 and Japanese Patent Application Laid Open No. 11-283875 are strong acids, in the case where the chemical oxidation polymerization is performed by employing an oxidizing agent solution having high concentration and repeatedly immersing a valve metal substrate in the oxidizing agent solution for a long time as described in Japanese Patent Application Laid Open No. 11-238648, Japanese Patent Application Laid Open No. 11-238649, Japanese Patent Application Laid Open No. 11-251192, Japanese Patent Application Laid Open No. 11-251193 and Japanese Patent Application Laid Open No. 11-283875, the valve metal substrate is materially damaged, thereby lowering yield in an aging process and degrading the leakage current characteristic of the electrolytic capacitor.

In particular, in a solid electrolytic capacitor, the surface of the valve metal such as aluminum is roughened and formed with an insulating oxide film in order to increase the capacity thereof. However, since a conductive polymer used for a solid high molecular polymer electrolyte layer has extremely poor solubility in an organic solvent and the viscosity of a solution obtained by dissolving a conductive polymer in an organic solvent is high, it is generally difficult to prepare a conductive polymer serving as electrolyte in advance and form the thus prepared conductive polymer on the surface of the valve metal which is roughened and formed with an insulating oxide film by means of impregnation, coating or the like.

Therefore, it is desired to develop a method for forming a solid high molecular polymer electrolyte layer containing a conductive polymer on the surface of a valve metal by immersing the surface of the valve metal which is roughened and formed in an insulating oxide film with a monomer solution or an oxidizing agent solution and then bringing the monomer solution or the oxidizing agent solution impregnating the surface of the valve metal into contact with an oxidizing agent solution or a monomer solution, thereby causing polymerization reaction on the surface of the valve metal which is roughened and formed with an insulating oxide film.

SUMMARY OF THE INVENTION

It is therefore an object of the present invention to provide a solid electrolytic capacitor having an excellent leakage current characteristic and a method for manufacturing a solid electrolytic capacitor which can produce a solid high molecular polymer electrolyte layer comprising polyethylene dioxythiophene under a normal temperature and in a short time without damaging a valve metal substrate constituting an electrode and produce a solid electrolytic capacitor whose leakage current is low.

The above other objects of the present invention can be accomplished by a method for manufacturing a solid electrolytic capacitor including a step of forming a solid high molecular polymer electrolyte layer on a surface of a first substrate made of a valve metal whose surface is roughened and which is formed with an insulating oxide film, the step of forming a solid high molecular polymer electrolyte layer including a first step of immersing the first substrate with an ethylene dioxythiophene solution, a second step of bringing the first substrate into contact with an oxidizing agent solution containing quadrivalent cerium salt at a concentration of 1% to 7% by weight and a step of repeating the first step and the second step a plurality of times, cumulative total time for performing the second step being shorter than five minutes.

In the present invention, it is required to use an oxidizing agent solution containing quadrivalent cerium salt at a concentration of 1% to 7% by weight, and a quadrivalent cerium salt solution with a concentration equal to or higher than 1% and lower than 5% by weight is preferably employed.

In the case where the concentration of the quadrivalent cerium salt solution is lower than 1% by weight, since the amount of polyethylene dioxythiophene produced is low, the ESR characteristic of the solid electrolytic capacitor is degraded. On the other hand, in the case where the concentration of a quadrivalent cerium salt solution exceeds 7% by weight, since damage of the first substrate serving as an electrode by the oxidizing agent solution progresses, the leakage current characteristic of a solid electrolytic capacitor is degraded and a solid electrolytic capacitor having excellent electrical characteristics cannot be manufactured.

Further, the case where the concentration of the quadrivalent cerium salt solution is equal to or higher than 1% and lower than 5% by weight is perferable, since it is possible to effectively prevent the first substrate serving as an electrode from being damaged by the oxidizing agent solution and a solid electrolytic capacitor having better electrical characteristics can be manufactured.

In this invention, it is required to use an oxidizing agent solution containing quadrivalent cerium salt at a concentration of 1% to 7% by weight and the cumulative total time for bringing the first substrate into contact with an oxidizing agent solution has to be shorter than five minutes.

Even in the case where an oxidizing agent solution containing quadrivalent cerium salt at a concentration of 1% to 7% by weight is employed, if the cumulative total time for bringing the first substrate into contact with an oxidizing agent solution becomes equal to or longer than five minutes, since damage of the first substrate serving as an electrode by oxidizing agent solution progresses, the leakage current characteristic of the solid electrolytic capacitor is degraded and a solid electrolytic capacitor having excellent electrical characteristics cannot be manufactured.

The above and other objects of the present invention can be also accomplished by a solid electrolytic capacitor including a solid high molecular polymer electrolyte layer comprising polyethylene dioxythiophene formed on a surface of a valve metal which is roughened and formed with an insulating oxide film, cerium being contained in the solid high molecular polymer electrolyte layer in an amount of 10 $\mu g/cm^2$ to 210 $\mu g/cm^2$.

In the case where a solid high molecular polymer electrolyte layer comprising polyethylene dioxythiophene is formed using an oxidizing agent solution containing quadrivalent cerium salt at a concentration of 1% to 7% by weight as an oxidizing agent solution, it has been confirmed that cerium is contained in the solid high molecular polymer electrolyte layer in an amount of 10 $\mu g/cm^2$ to 210 $\mu g/cm^2$ and that a solid electrolytic capacitor formed with a solid high molecular polymer electrolyte layer comprising polyethylene dioxythiophene containing cerium in an amount of 10 $\mu g/cm^2$ to 210 $\mu g/cm^2$ has high capacitance as well as a excellent leakage current characteristic and a excellent ESR characteristic.

In the present invention, cerium is preferably contained in the solid high molecular polymer electrolyte layer comprising polyethylene dioxythiophene in an amount of 10 $\mu g/cm^2$ to 150 $\mu g/cm^2$.

It has been found that in the case where a solid high molecular polymer electrolyte layer comprising polyethylene dioxythiophene is formed using as an oxidizing agent solution containing quadrivalent cerium salt at a concentration equal to or higher than 1% and lower than 5% by weight, cerium is contained in the solid high molecular polymer electrolyte layer in an amount of 10 $\mu g/cm^2$ to 150 $\mu g/cm^2$ and that a solid electrolytic capacitor formed with a solid high molecular polymer electrolyte layer comprising polyethylene dioxythiophene containing cerium in an amount of 10 $\mu g/cm^2$ to 150 $\mu g/cm^2$ has a better leakage current characteristic.

In a preferred aspect of the present invention, the method for manufacturing a solid electrolytic capacitor further includes a step of forming a lead electrode metal substrate made of at least one kind of metal and a step of forming a connected body of the first substrate and the lead electrode metal substrate by positioning the first substrate made of a valve metal whose surface is roughened and the lead electrode metal substrate in such a manner that a region in the vicinity of one end portion of the first substrate and a region in the vicinity of one end portion of the lead electrode metal substrate are overlapped and connecting the region in the vicinity of one end portion of the first substrate and the region in the vicinity of one end portion of the lead electrode metal substrate with each other.

In a further preferred aspect of the present invention, the method for manufacturing a solid electrolytic capacitor further includes steps of dipping the first substrate constituting the connected body into a forming solution prior to forming the solid high molecular polymer electrolyte layer, applying voltage to the connected body to be subjected to anodic oxidation and forming an insulating oxide film at least at an edge portion of the first substrate.

In a preferred aspect of the present invention, the solid high molecular polymer electrolyte layer is formed on the surface of the first substrate made of a valve metal which is roughened by immersing the first substrate into the oxidizing agent solution.

In a further preferred aspect of the present invention, the step of forming the lead electrode metal substrate includes a step of positioning a second substrate whose surface is not roughened and a third substrate made of a metal except for a valve metal in such a manner that at least portions thereof are overlapped and connecting overlapped portions with each other, and the step of forming the connected body of the lead electrode metal substrate and the first substrate and includes a step of connecting the second substrate constituting the lead electrode metal substrate and the first substrate.

In the case where the first substrate and the third substrate are directly connected, when the chemical oxidation polymerization is performed, a monomer solution and an oxidizing agent solution can advance along the roughened surface of the first substrate due to capillary action and reach the third substrate forming the lead electrode metal substrate, thereby corroding the third substrate. However, according to this preferred aspect of the present invention, since the second substrate whose surface is not roughened is present between the first substrate whose surface is roughened and the lead electrode metal substrate, when the chemical oxidation polymerization is performed, the monomer solution and the oxidizing agent solution do not reach the third substrate forming the lead electrode metal substrate beyond a portion where the first substrate whose surface is roughened and the second substrate whose surface is not roughened are connected and, therefore, it is possible to reliably prevent the third substrate forming the lead electrode metal substrate from being corroded by the monomer solution or the oxidizing agent solution.

In a preferred aspect of the present invention, the method for manufacturing a solid electrolytic capacitor further includes a step of coating conductive paste on the solid high molecular polymer electrolyte layer and drying it, thereby forming a conductive layer.

In a further preferred aspect of the present invention, the connected body of the first substrate and the lead electrode metal substrate is formed by connecting the first substrate whose surface is roughened and formed with an insulated oxide film and the second substrate whose surface is not roughened by ultrasonic welding or cold welding, and connecting the second substrate whose surface is not roughened and the third substrate by ultrasonic welding or cold welding.

In the present invention, the first substrate is formed of metal or alloy selected from a group consisting of metal capable of forming an insulating oxide film and alloys thereof. Illustrative examples of valve metals preferably usable in the present invention include one kind of metal or alloy of two or more kinds of metal selected from a group consisting of aluminum, tantalum, titanium, niobium and zirconium, and aluminum and tantalum are most preferable. An anodic electrode is formed by processing the metal or alloy to a foil.

In the present invention, the material for forming the third substrate is not particularly limited but may be any type of metal or alloy insofar as it has conductivity. The third substrate can preferably be formed of metal or alloy which can be connected by soldering and more preferably be formed of one kind of metal or alloy of two or more kinds of metal selected from a group consisting of copper, brass, nickel, zinc and chromium. Among these, copper is most preferably used for forming the third substrate from the viewpoint of electric characteristics, workability in following steps, cost and the like.

In the present invention, a quadrivalent cerium salt such as cerium sulfate and cerium diammonium nitrate is employed as an oxidizing agent. Among these, cerium (IV) sulfate is most preferably used in the present invention.

In the present invention, a compound serving as a dopant may be added to an oxidizing agent solution as occasions demand.

In the present invention, illustrative examples of compounds serving as a dopant which are added as occasions demand include salts such as $LiPH_6$, $LiAsF_6$, $NaPF_6$, $KPF_6$, $KAsF_6$ whose anion is hexafluorophosphate anion or hexafluoroarsenate (V) anion and whose cation is an alkaline metal cation such as lithium, sodium, potassium and the like; boron tetrafluorides such as $LiBF_4$, $NaBF_4$, $NH_4BF_4$, $(CH_3)_4NBF_4$, $(n-C_4H_9)_4NBF_4$ and the like; sulfonic acids such as p-toluene sulfonic acid, p-ethyl benzene sulfonic acid, p-hydroxybenzene sulfonic acid, dodecylbenzene sulfonic acid, methyl sulfonic acid, dodecyl sulfonic acid, benzene sulfonic acid, β-naphthalene sulfonic acid or the like and derivatives thereof; alkylnaphthalene/sulfonic acids such as butylnaphthalene sodium sulfonate, 2,6-naphthalene sodium disulfonate, toluene sodium sulfonate, toluene tetrabutyl ammonium sulfonate, or the like and the derivatives thereof; metal halides such as ferric chloride, ferric bromide, cupric chloride, cupric bromide or the like; hydrochloric acid, hydrogen bromide, hydrogen iodide, sulfuric acid, phosphoric acid, nitric acid or alkaline metal salt thereof, alkaline earth metal salt thereof or ammonium salt thereof; halogen acid such as perhalogen acid or a salt thereof such as perchloric acid, sodium perchlorate or the like; inorganic acid or a salt thereof; halogenated carboxylic acids such as monocarboxylic acid or dicarboxylic acid such as acetic acid, oxalic acid, formic acid, butyric acid, succinic acid, lactic acid, citric acid, phthalic acid, maleic acid, benzoic acid, salicylic acid, nicotinic acid or the like, aromatic heterocyclic carboxylic acid, trifluoroacetic acid and salts thereof.

In the present invention, a compound serving as a dopant is dissolved in water or an organic solvent and used in the form of a suitable solution. A single kind of solvent or mixed solvents may be used. It is effective to use mixed solvents for increasing the solubility of a compound serving as a dopant. It is preferable for solvents used for mixed solvents to have compatibility therewith and compatibility with an oxidizing agent and the compound serving as a dopant. Illustrative examples of solvents include organic amides, sulphur-containing compounds, esters and alcohols.

In the present invention, a conductive polymer compound can be produced by effecting polymerization while the reaction system is irradiated with ultrasound as disclosed in Japanese Patent Application Laid Open No. 2000-100665. In the case where a conductive polymer compound is produced by effecting polymerization while the reaction system is irradiated with ultrasound, the quality of the solid high molecular polymer electrolyte layer can be improved.

In the present invention, the maximum thickness of the solid high molecular polymer electrolyte layer is not particularly limited insofar as the surface irregularity of the anodic electrode can be completely eliminated by etching or the like and is normally in the range of about 5 to about 100 μm.

In the present invention, the solid electrolytic capacitor further includes a conductive layer serving as a cathode on the solid high molecular polymer electrolyte layer. The conductive layer may be constituted as a graphite paste layer and a silver paste layer and the graphite paste layer and the silver paste layer can be formed by a screen printing method, a spray coating method or the like. Although the cathode of the solid electrolytic capacitor may be constituted by only a silver paste layer, if a graphite paste layer is formed, it is possible to prevent silver from migrating in comparison with the case where the cathode of the solid electrolytic capacitor is constituted by only a silver paste layer.

When a graphite paste layer and a silver paste layer are to be formed as the cathode, the graphite paste layer and the silver paste layer are formed on only a portion corresponding to the portion of the valve metal on which the insulating oxide film is formed.

In the present invention, the solid electrolytic capacitor is fixed on one surface of an insulating substrate formed with at least one wiring pattern on the other surface thereof or fixed between surfaces of a pair of insulating substrates facing each other, each being formed with at least one wiring pattern on the other surface thereof.

In the present invention, the material for forming the insulating substrate is not particularly limited and the insulating substrate can be formed of a phenol resin, a polyimide resin, an epoxy resin, a polyester resin or the like which has a good adhesive property and good solvent resistance. Further, the insulating substrate may be formed of an inorganic material instead of an organic material and a substrate made of metal oxides such as an alumina substrate can be used as an insulating substrate in the present invention.

In the present invention, the solid electrolytic capacitor is disposed on a lead frame made of a conductive metal, connected thereto and molded with a resin.

It is sufficient for a lead frame usable in the present invention to be formed of a conductive metal. The material for forming the lead frame is not particularly limited and copper, phosphor bronze, brass or the like is preferably employed for forming the lead frame.

In the present invention, a transfer molding method and an injection molding method are preferably used as the method for molding the solid electrolytic capacitor with a resin.

In the present invention, the resin material usable for molding a solid electrolytic capacitor is not particularly limited and an epoxy resin, a polyphenylene sulfide resin, polybutyl terephthalate, polyethylene, polypropylene, an ABS resin, unsaturated polyester, diaryl phthalate, a phenol resin, a silicon resin or the like, for example, can be used as the resin material for molding a solid electrolytic capacitor.

DESCRIPTION OF THE PREFERRED EMBODIMENTS

Hereinafter, a preferred embodiment of the present invention will be described in detail with reference to accompanying drawings.

Figure 1:
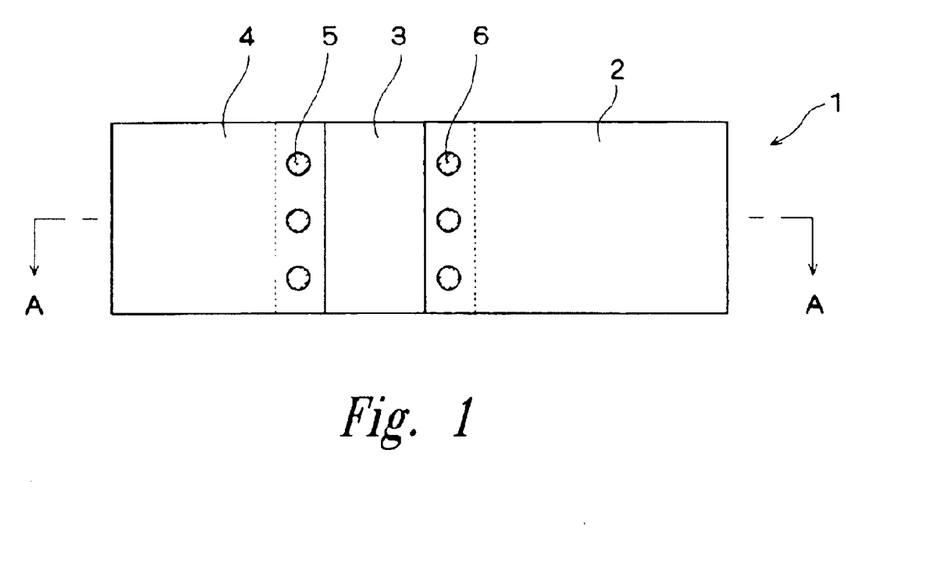
FIG. 1 is a schematic plan view showing an anodic electrode of a solid electrolytic capacitor which is a preferred embodiment of the present invention.
Figure 2:
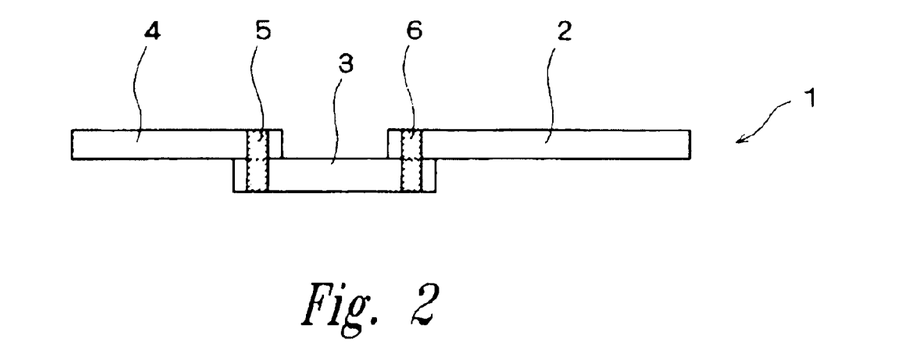
FIG. 2 is a schematic cross sectional view taken along a line A—A in FIG. 1.

FIG. 1 is a schematic plan view showing the anodic electrode of a solid electrolytic capacitor which is a preferred embodiment of the present invention and FIG. 2 is a schematic cross sectional view taken along a line A—A in FIG. 1.

In this embodiment, aluminum is used as a valve metal capable of forming an insulating oxide film and as shown in FIGS. 1 and 2, an anodic electrode 1 of the solid electrolytic capacitor according to this embodiment includes a foil-like aluminum substrate 2 whose surface is roughened and which is formed with an aluminum oxide film on the surface thereof as an insulating oxide film, a foil-like aluminum substrate 3 whose surface is not roughened, and a foil-like copper substrate 4 as a metal electric conductor for constituting a lead electrode.

As shown in FIGS. 1 and 2, the anodic electrode according to this embodiment is formed in such a manner that one end portion region of the foil-like aluminum substrate 3 whose surface is not roughened is connected to one end portion region of the foil-like aluminum substrate 2 whose surface is roughened and which is formed with an aluminum oxide film on the surface thereof by ultrasonic welding so as to establish electrical connection between the valve metals, and one end portion region of the foil-like copper substrate 4 is connected to the other end portion region of the foil-like aluminum substrate 3 whose surface is not roughened by ultrasonic welding so as to establish electrical connection between the metals.

When the anodic electrode is to be formed, the foil-like copper substrate 4 for constituting a lead electrode is cut to have a predetermined size and the foil-like aluminum substrate 3 which is cut from an aluminum foil sheet and whose surface is not roughened are first superposed in such a manner that end portion regions thereof having predetermined areas are overlapped.

The end portion region of the foil-like copper substrate 4 and the end portion region of the foil-like aluminum substrate 3 superposed in this manner are connected to each other by ultrasonic welding, thereby forming a welding connected portion 5. Even in the case where an aluminum oxide film is formed on the surface of the foil-like aluminum substrate 3, the aluminum oxide film is removed by connecting the foil-like copper substrate 4 to the foil-like aluminum substrate 3 by ultrasonic welding, whereby the end portion region of the foil-like copper substrate 4 and the end portion region of the foil-like aluminum substrate 3 are electrically connected to each other. The areas of the end portion region of the foil-like copper substrate 4 and the end portion region of the foil-like aluminum substrate 3 to be superposed are determined so that the connected portion can have a predetermined strength.

The foil-like aluminum substrate 2 whose surface is roughened and which is formed with an aluminum oxide film on the surface thereof is then cut from an aluminum foil sheet so as to have a predetermined size and superposed on the foil-like aluminum substrate 3 whose surface is not roughened of the connected body of the foil-like copper substrate 4 and the foil-like aluminum substrate 3 in such a manner that end portion regions having predetermined areas are overlapped.

The end portion region of the foil-like aluminum substrate 2 whose surface is roughened and which is formed with the aluminum oxide film on the surface thereof and the end portion region of the foil-like aluminum substrate 3 whose surface is not roughened superposed in this manner are then connected to each other by ultrasonic welding, thereby forming a welding connected portion 6. The aluminum oxide film formed on the surface of the foil-like aluminum substrate 2 is removed by connecting the foil-like aluminum substrate 2 and the foil-like aluminum substrate 3 by ultrasonic welding, whereby metal of the end portion region of foil-like aluminum substrate 2 whose surface is roughened and metal of the end portion region of the foil-like aluminum substrate 3 whose surface is not roughened are electrically connected. The areas of the end portion region of the foil-like aluminum substrate 3 and the end portion region of the foil-like aluminum substrate 2 to be superposed are determined so that the connected portion can have a predetermined strength.

Since the foil-like aluminum substrate 2 whose surface is roughened and which is formed with the aluminum oxide film on the surface thereof for constituting dielectric is cut from an aluminum foil sheet, no aluminum oxide film is formed on an edge portion thereof and, therefore, it is required to form an aluminum oxide film on an edge portion of the foil-like aluminum substrate 2 whose surface is roughened by anodic oxidation in order to use the thus formed anodic electrode 1 as an anodic electrode of a solid electrolytic capacitor.

Figure 3:
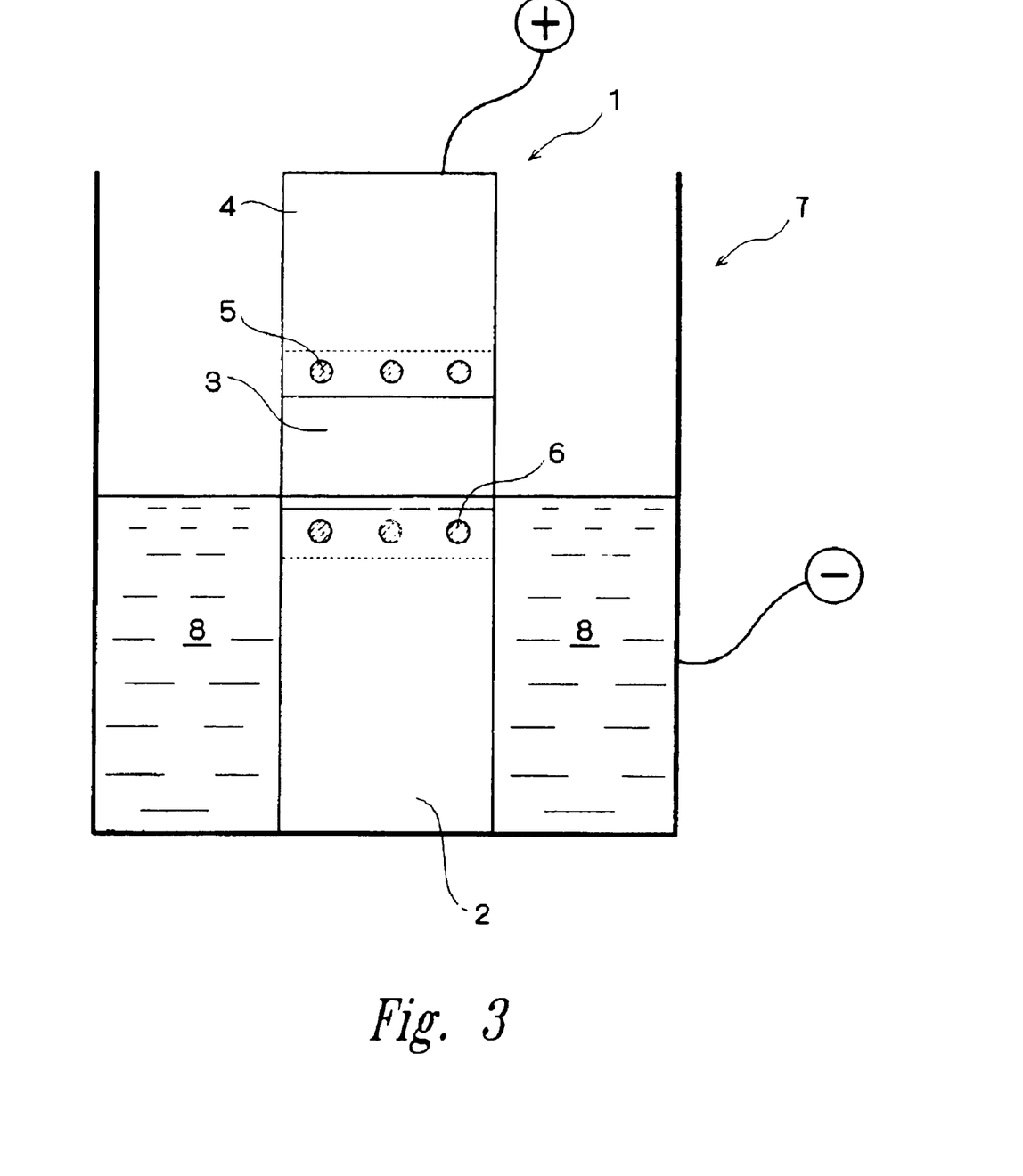
FIG. 3 is a schematic cross sectional view showing a method for forming an aluminum oxide film on an edge portion of a foil-like aluminum substrate whose surface is roughened.

FIG. 3 is a schematic cross sectional view showing an anodic oxidation method for forming an aluminum oxide film on an edge portion of the foil-like aluminum substrate 2 whose surface is roughened.

As shown in FIG. 3, the anodic electrode 1 is set in a forming solution 8 consisting of an ammonium adipate solution accommodated in a beaker made of stainless steel in such a manner that the whole foil-like aluminum substrate 2 whose surface is roughened and a part of the foil-like aluminum substrate 3 whose surface is not roughened are immersed in the forming solution 8 and voltage is applied with the foil-like copper substrate 4 is connected to the plus side and the beaker 7 made of stainless steel is connected to the minus side.

The applied voltage can be determined in accordance with the thickness of the aluminum oxide film to be formed and when an aluminum oxide film having a thickness of 10 nm to 1 μm is to be formed, the applied voltage is normally determined to be several volts to about twenty volts.

As a result, anodic oxidation is started. Although the forming solution moves upward during the anodic oxidation operation since the surface of the foil-like aluminum substrate 2 is roughened, it does not move upward beyond the connected portion of the foil-like aluminum substrate 2 whose surface is roughened and the foil-like aluminum substrate 3 whose surface is not roughened since the surface of the foil-like aluminum substrate 3 is not roughened. Therefore, it is possible to reliably prevent the forming solution from coming into contact with the foil-like copper substrate 4 for constituting a lead electrode and an aluminum oxide film is formed on only a region, which includes an edge portion of the foil-like aluminum substrate 2 whose surface is roughened, of the foil-like aluminum substrate 2 whose surface is roughened and the foil-like aluminum substrate 3 whose surface is not roughened and which is connected to the foil-like aluminum substrate 2 whose surface is roughened.

A solid high molecular polymer electrolyte layer comprising polyethylene dioxythiophene is then formed on by chemical oxidization polymerization on the surface of the foil-like aluminum substrate 2 which is roughened and formed with the aluminum oxide film of the thus formed anodic electrode 1.

Specifically, the foil-like aluminum substrate 2 whose surface is roughened and which is formed with the aluminum oxide film on the surface thereof is immersed in a monomer solution containing ethylene dioxythiophene for several tens of seconds. After the foil-like aluminum substrate 2 is removed from the monomer solution, only solvent is removed under a normal temperature.

Ceric sulfate tetrahydrate is then dissolved in water to prepare a ceric sulfate solution of 1 to 7% by weight and the foil-like aluminum substrate 2 whose surface is roughened and which is formed with the aluminum oxide film on the surface thereof is immersed in the ceric sulfate solution for several tens of seconds. After the foil-like aluminum substrate 2 is taken from the ceric sulfate solution, it is cleaned with water or an organic solvent and dried.

These steps are repeated a plurality of times so that the cumulative total time during which the aluminum substrate 2 is immersed in the ceric sulfate solution is shorter than five minutes. Thereafter, the aluminum substrate 2 is cleaned with water or an organic solvent and dried, whereby a solid high molecular polymer electrolyte layer comprising polyethylene dioxythiophene is formed on the surface of the aluminum substrate 2 which is roughened and formed with the aluminum oxide film.

A graphite paste layer and a silver paste layer are then formed on the surface of the solid high molecular polymer electrolyte layer by the screen printing method or the spray coating method, thereby forming a cathode electrode.

Figure 4:
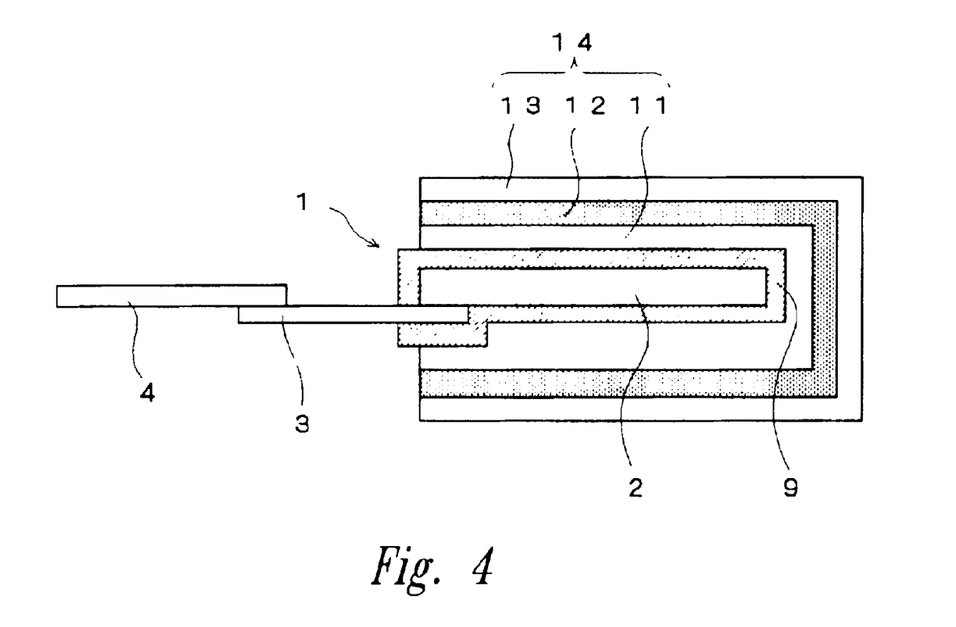
FIG. 4 is a schematic cross sectional view showing a solid electrolytic capacitor.

FIG. 4 is a schematic cross sectional view showing the thus manufactured solid electrolytic capacitor.

As shown in FIG. 4, the solid electrolytic capacitor 10 includes the anodic electrode 1 including the lead electrode formed of the foil-like aluminum substrate 2, and the foil-like aluminum substrate 3 and the foil like copper substrate 4, and the cathode electrode 14 formed by laminating the solid high molecular polymer electrolyte layer 11, the graphite paste layer 12 and the silver paste layer 13.

According to this embodiment, since the steps of immersing the foil-like aluminum substrate 2 whose surface is roughened and which is formed with the aluminum oxide film on the surface thereof in the monomer solution containing ethylene dioxythiophene for several tens of seconds, taking it from the monomer solution, removing only the solvent under a normal temperature, immersing the foil-like aluminum substrate 2 in the ceric sulfate solution of 1 to 7% by weight for several tens of seconds, removing it from the ceric sulfate solution, cleaning it with water or an organic solvent and drying it are repeated a plurality of times so that the cumulative total time during which the aluminum substrate 2 is immersed in the ceric sulfate solution constituting an oxidizing agent solution is shorter than five minutes, thereby forming the solid high molecular polymer electrolyte layer comprising polyethylene dioxythiophene under a normal temperature and in a short time, the solid high molecular polymer electrolyte layer comprising polyethylene dioxythiophene can be formed without causing any risk of damaging the valve metal substrate constituting an electrode. Therefore, a solid electrolytic capacitor having an excellent leakage current characteristic can be manufactured and since the valve metal substrate constituting an electrode is not damaged even if the thus manufactured solid electrolytic capacitor is left in a high temperature and high humid environment, a solid electrolytic capacitor having good environmental resistance can be obtained.

Further, according to this embodiment, the anodic electrode 1 of the solid electrolytic capacitor includes the foil-like aluminum substrate 2 whose surface is roughened and which is formed with the aluminum oxide film on the surface thereof, the foil-like aluminum substrate 3 whose surface is not roughened and the foil-like copper substrate 4 as a metal electric conductor and is formed by connecting one end portion region of the foil-like aluminum substrate 2 whose surface is roughened and which is formed with the aluminum oxide film on the surface thereof and one end portion region of the foil-like aluminum substrate 3 whose surface is not roughened by ultrasonic welding and connecting the other end portion region of the foil-like aluminum substrate 3 whose surface is not roughened and one end portion region of the foil-like copper substrate 4 by ultrasonic welding, when a solid high molecular polymer electrolyte layer comprising polyethylene dioxythiophene is to be formed on the surface of the foil-like aluminum substrate 2 whose surface is roughened, even if the monomer solution or the oxidizing agent solution advances along the foil-like aluminum substrate 2 whose surface is roughened by capillary action, it does not move upward beyond the connected portion of the foil-like aluminum substrate 2 whose surface is roughened and the foil-like aluminum substrate 3 whose surface is not roughened. Therefore, since it is possible to reliably prevent the monomer solution or the oxidizing agent solution from coming into contact with the foil-like copper substrate 4 for constituting a lead electrode, the foil-like copper substrate 4 for constituting a lead electrode can be reliably prevented from being corroded by the monomer solution or the oxidizing agent solution.

Hereinafter, working examples will be set out in order to further clarify the advantages of the present invention.

WORKING EXAMPLE 1

A solid electrolytic capacitor including a solid high molecular polymer electrolyte layer was prepared in the following manner.

A copper foil cut from a copper foil sheet so as to have a size of 0.5 cm×1 cm and a thickness of 60 $\mu$m and an aluminum foil whose surface was not roughened cut from an aluminum foil sheet so as to have a size of 1 cm×1 cm and a thickness of 60 $\mu$m were superposed in such a manner that one end portion regions thereof were overlapped by 3 mm and the superposed portions thereof were connected using a "40 kHz-Ultrasonic Welding Machine" manufactured by Branson Ultrasonics Division of Emerson Japan Limited, thereby forming a connected body of the copper foil and the aluminum foil whose surface was not roughened. Since the copper foil and the aluminum foil were connected by welding, they was able to be electrically connected.

An aluminum foil was cut from the sheet of an aluminum foil having a thickness of 100 $\mu$m which was formed with an aluminum oxide film on the surface thereof and whose surface was roughened so as to have a size of 2 cm×1.5 cm and was superposed on the connected body of the copper foil and the aluminum foil whose surface was not roughened in such a manner that an end portion region thereof and the other end portion region of the aluminum foil whose surface was not roughened were overlapped by 3 mm. Then, the end portion regions overlapped with each other were connected using the "40 kHz-Ultrasonic Welding Machine" manufactured by Branson Ultrasonics Division of Emerson Japan Limited, thereby forming a connected body of the copper foil, the aluminum foil whose surface was not roughened and the aluminum foil whose surface was roughened. In this case, since the aluminum foil whose surface was roughened and the aluminum foil were connected by welding, they was able to be electrically connected.

Further, the connected body was set in an aqueous solution of ammonium adipate prepared to have a concentration of 7% by weight, pH 6.8 and temperature of 80 degrees (centigrade) so that the aluminum foil whose surface was formed with an aluminum oxide film and roughened was completely immersed therein. At this time, a part of the aluminum foil whose surface was not roughened was immersed in the aqueous solution of ammonium adipate but the copper foil was not brought into contact with the aqueous solution of ammonium adipate.

An anodic electrode was manufactured by connecting the connected body to an anode, oxidizing the surface of the aluminum foil immersed in the aqueous solution of ammonium adipate under the condition that a forming current density was set at 50 to 100 mA/cm2 and a forming voltage was set equal to or lower than 22 volts and forming an aluminum oxide film on the surface of the aluminum foil.

Then, the thus manufactured anodic electrode was extracted from the aqueous solution of ammonium adipate and a solid high molecular polymer electrolyte layer containing polyethylene dioxythiophene as a main component was formed by chemical oxidization polymerization on the surface of the aluminum foil of the anodic electrode which was roughened in the following manner.

A monomer solution was prepared by mixing the following solute 1 and solute 2 in an ethanol solution of 13.4 grams and agitating the solution.

| | |
|---|---|
| Solute 1: 3,4-ethylene dioxythiophene | 0.56 grams |
| Solute 2: alkylnaphthalene sodium sulfonate aqueous solution | 3.2 grams |

Then, a ceric sulfate aqueous solution of 3% by weight was prepared as an oxidizing agent solution by dissolving ceric sulfate tetrahydrate in water.

The anodic electrode was immersed in the monomer solution for thirty (30) seconds and extracted from the monomer solution, thereby being dried under a normal temperature.

The anodic electrode was then immersed in the oxidizing agent solution for fifteen seconds (15), thereby polymerizing 3,4-ethylene dioxythiophene and was extracted from the oxidizing agent solution. The anodic electrode was cleaned using water and ethanol and was dried under a normal temperature, thereby producing poly (3,4-ethylene dioxythiophene).

The steps of immersing the anodic electrode in the monomer solution, drying the anodic electrode, immersing the anodic electrode in the oxidizing agent solution, cleaning the anodic electrode and drying the anodic electrode were repeated ten times, thereby forming a solid high molecular polymer electrolyte layer containing poly (3,4-ethylene dioxythiophene) as a main component and having a thickness of 50 $\mu$m.

Carbon paste was coated on the surface of the thus obtained solid high molecular polymer electrolyte layer and silver paste was further coated on the carbon paste, thereby forming a cathode electrode. Then, lead wires were attached to the cathode electrode using a silver-epoxy system adhesive agent.

Afterward, aging was conducted in a well-known manner by applying a predetermined voltage to an anode lead terminal and a cathode lead terminal so as to sufficiently lower leakage current, thereby manufacturing a solid electrolytic capacitor sample #1. Ten solid electrolytic capacitor samples #1 in total were manufactured under the same conditions.

Further, a solid electrolytic capacitor sample #2 was manufactured in the same manner as that of manufacturing the solid electrolytic capacitor samples #1 except that time during which the anodic electrode was immersed in the oxidizing agent solution per time was set at twenty five (25) seconds. Ten solid electrolytic capacitor samples #2 in total were manufactured under the same conditions.

Furthermore, a solid electrolytic capacitor sample #3 was manufactured in the same manner as that of manufacturing the solid electrolytic capacitor samples #1 except that time during which the anodic electrode was immersed in the oxidizing agent solution per time was set at 1 minute. Ten solid electrolytic capacitor samples #3 in total were manufactured under the same conditions.

Moreover, a solid electrolytic capacitor sample #4 was manufactured in the same manner as that of manufacturing the solid electrolytic capacitor samples #1 except that time during which the anodic electrode was immersed in the oxidizing agent solution per time was set at 5 minutes. Ten solid electrolytic capacitor samples #4 in total were manufactured under the same conditions.

Further, a solid electrolytic capacitor sample #5 was manufactured in the same manner as that of manufacturing the solid electrolytic capacitor samples #1 except that time during which the anodic electrode was immersed in the oxidizing agent solution per time was set at ten (10) minutes. Ten solid electrolytic capacitor samples #5 in total were manufactured under the same conditions.

The electrical characteristics of the thus manufactured solid electrolytic capacitor samples #1 to #5 were assessed using an "Impedance Analyzer 4294A" manufactured by Alienate Technologies. The electrostatic capacities at 120 Hz and ESR at 100 kHz were measured as characteristic values. Leakage current was measured by connecting the solid electrolytic capacitor samples #1 to #5 to a predetermined circuit and measuring the current value five minutes after applying a voltage of 6.3 volts to the circuit with the standard upper limit value of leakage current set equal to or lower than 63 $\mu$A (0.05 CV).

The results of assessing the electrical characteristics of the solid electrolytic capacitor samples #1 to #5 are shown in Table 1. Each of numerical values shown in Table 1 is the average value of the electrical characteristic for ten solid electrolytic capacitor samples.

tance and a good ESR characteristic. However, it was observed that a good leakage current value was obtained in each of the solid electrolytic capacitor samples #1 and #2 each manufactured by contacting the anodic electrode and the oxidizing agent solution for a time shorter than five minutes, while leakage current values were extremely high and the leakage current characteristic was degraded in the solid electrolytic capacitor samples #3 to #5 each manufactured by contacting the anodic electrode and the oxidizing agent solution for five minutes or longer in total.

Therefore, it was demonstrated that in the case where a ceric sulfate aqueous solution of 3% by weight was used as an oxidizing agent solution, it was indispensable to keep total time during which the anodic electrode is immersed in the oxidizing agent solution shorter than five minutes for manufacturing a solid electrolytic capacitor having a good leakage current characteristic.

WORKING EXAMPLE 2

Solid electrolytic capacitor samples #6 to #10 each including ten samples were manufactured in the same manner as that in Working Example 1 except that a ceric sulfate aqueous solution of 1% by weight was used.

When each of the solid electrolytic capacitor samples #6 to #10 was manufactured, the time during which the anodic electrode was immersed in the oxidizing agent solution per time was set at fifteen (15) seconds, twenty five (25) seconds, one minute, 5 minutes and ten (10) minutes, respectively.

The electrical characteristics of the thus manufactured solid electrolytic capacitor samples #6 to #10 were assessed in the same manner as that in Working Example 1.

The results of assessing the electrical characteristics of the solid electrolytic capacitor samples #6 to #10 are shown in Table 2. Each of numerical values shown in Table 2 is the

TABLE 1

| Sample # | Number of samples | Polymerization time per time (min) | Number of polymerizations | Total contact time with oxidizing agent (min) | Average values | | |
|---|---|---|---|---|---|---|---|
| | | | | | Electrostatic capacity (120 Hz) [$\mu$F] | ESR (100 kHz) [m$\Omega$] | Leakage current (6.3 V, 5 min) [$\mu$A] |
| #1 | 10 | 0.25 | 10 times | 2.5 | 186.2 | 31.4 | 0.64 |
| #2 | 10 | 0.42 | 10 times | 4.2 | 182.8 | 32.0 | 0.59 |
| #3 | 10 | 1 | 10 times | 10.0 | 185.9 | 33.3 | 36.7 |
| #4 | 10 | 5 | 10 times | 50 | 192.0 | 32.8 | 416 |
| #5 | 10 | 10 | 10 times | 100 | 180.1 | 35.6 | 4956 |

As shown in Table 1, the thus manufactured solid electrolytic capacitor samples #1 to #5 exhibited a good capacitance average value of the electrical characteristic for ten solid electrolytic capacitor samples.

TABLE 2

| Sample # | Number of samples | Polymerization time per time (min) | Number of polymerizations | Total contact time with oxidizing agent (min) | Average values | | |
|---|---|---|---|---|---|---|---|
| | | | | | Electrostatic capacity (120 Hz) [$\mu$F] | ESR (100 kHz) [m$\Omega$] | Leakage current (6.3 V, 5 min) [$\mu$A] |
| #6 | 10 | 0.25 | 10 times | 2.5 | 168.2 | 48.4 | 0.34 |
| #7 | 10 | 0.42 | 10 times | 4.2 | 171.5 | 38.5 | 0.55 |

TABLE 2-continued

| Sample # | Number of samples | Polymerization time per time (min) | Number of polymerizations | Total contact time with oxidizing agent (min) | Average values | | |
|---|---|---|---|---|---|---|---|
| | | | | | Electrostatic capacity (120 Hz) [$\mu$F] | ESR (100 kHz) [m$\Omega$] | Leakage current (6.3 V, 5 min) [$\mu$A] |
| #8 | 10 | 1 | 10 times | 10.0 | 181.0 | 37.5 | 84.1 |
| #9 | 10 | 5 | 10 times | 50 | 180.4 | 39.2 | 476 |
| #10 | 10 | 10 | 10 times | 100 | 178.1 | 39.7 | 4356 |

As shown in Table 2, it was observed that a good leakage current value was obtained in each of the solid electrolytic capacitor samples #6 and #7 each manufactured by contacting the anodic electrode and the oxidizing agent solution for a time shorter than five minutes, while leakage current values were extremely high and the leakage current characteristic was degraded in the solid electrolytic capacitor samples #8 to #10 each manufactured by contacting the anodic electrode and the oxidizing agent solution for five minutes or longer in total.

Therefore, it was demonstrated that in the case where a ceric sulfate aqueous solution of 1% by weight is used as an oxidizing agent solution, it is indispensable to keep total time during which the anodic electrode is immersed in the oxidizing agent solution shorter than five minutes for manufacturing a solid electrolytic capacitor having a good leakage current characteristic.

Further, the capacitance of each of the solid electrolytic capacitor samples #6 to #10 was decreased and an ESR values thereof was increased in comparison with the corresponding solid electrolytic capacitor sample #1 to #5 in Working Example 1. It can be considered that this is because the concentration of the ceric sulfate aqueous solution constituting the oxidizing agent solution was lower than that in Working Example 1 and, therefore, the amount of poly (3,4-ethylene dioxythiophene) produced was lower.

Therefore, it was demonstrated that in the case where the concentration of the ceric sulfate aqueous solution used as an oxidizing agent solution is lower than 1% by weight, the ESR value is further increased and that a solid electrolytic capacitor having a good ESR characteristic cannot be manufactured.

WORKING EXAMPLE 3

Solid electrolytic capacitor samples #11 to #15 each including ten samples were manufactured in the same manner as that in Working Example 1 except that a ceric sulfate aqueous solution of 5% by weight was used.

When each of the solid electrolytic capacitor samples #11 to #15 was manufactured, the time during which the anodic electrode was immersed in the oxidizing agent solution per time was set at fifteen (15) seconds, twenty five (25) seconds, one minute, 5 minutes and ten (10) minutes, respectively.

The electrical characteristics of the thus manufactured solid electrolytic capacitor samples #11 to #15 were assessed in the same manner as that in Working Example 1.

The results of assessing the electrical characteristics of the solid electrolytic capacitor samples #11 to #15 are shown in Table 3. Each of numerical values shown in Table 3 is the average value of the electrical characteristic for ten solid electrolytic capacitor samples.

TABLE 3

| Sample # | Number of samples | Polymerization time per time (min) | Number of polymerizations | Total contact time with oxidizing agent (min) | Average values | | |
|---|---|---|---|---|---|---|---|
| | | | | | Electrostatic capacity (120 Hz) [$\mu$F] | ESR (100 kHz) [m$\Omega$] | Leakage current (6.3 V, 5 min) [$\mu$A] |
| #11 | 10 | 0.25 | 10 times | 2.5 | 186.5 | 34.0 | 1.05 |
| #12 | 10 | 0.42 | 10 times | 4.2 | 190.5 | 34.6 | 1.10 |
| #13 | 10 | 1 | 10 times | 10.0 | 189.7 | 37.2 | 84.2 |
| #14 | 10 | 5 | 10 times | 50 | 179.9 | 36.9 | 636 |
| #15 | 10 | 10 | 10 times | 100 | 183.1 | 40.8 | 7756 |

As shown in Table 3, it was observed that a good leakage current value was obtained in each of the solid electrolytic capacitor samples #11 and #12 each manufactured by contacting the anodic electrode and the oxidizing agent solution for a time shorter than five minutes, while leakage current values were extremely high and the leakage current characteristic was degraded in the solid electrolytic capacitor samples #13 to #15 each manufactured by contacting the anodic electrode and the oxidizing agent solution for five minutes or longer in total.

Further, as shown in Table 3, the leakage current value was increased in each of the solid electrolytic capacitor samples #11 and #12 each manufactured by contacting the anodic electrode and the oxidizing agent solution for a time shorter than five minutes in comparison with the corresponding solid electrolytic capacitor sample #1 or #2 in Working Example 1. It can be considered that this is because the concentration of the ceric sulfate aqueous solution constituting the oxidizing agent solution was higher than that in Working Example 1 and, therefore, damage to the anodic electrode was increased.

Furthermore, as shown in Table 3, the ESR value of each of the solid electrolytic capacitor samples #11 to #15 was slightly increased in comparison with the corresponding solid electrolytic capacitor sample #1 to #5 in Working Example 1. It can be considered that this is because a ceric sulfate aqueous solution having higher concentration than that the ceric sulfate aqueous solution used in Working Example 1 was used as the oxidizing agent solution while the concentration of the monomer solution was kept unchanged and, therefore, the electrical conductivity of poly (3,4-ethylene dioxythiophene) produced was slightly increased.

Therefore, it was demonstrated that in the case where a ceric sulfate aqueous solution of 5% by weight is used as an oxidizing agent solution, it is indispensable to keep the total time during which the anodic electrode is immersed in the oxidizing agent solution shorter than five minutes for manufacturing a solid electrolytic capacitor having a good leakage current characteristic and that it is preferable to use a ceric sulfate aqueous solution having a concentration lower than 5% by weight for manufacturing a solid electrolytic capacitor having a good leakage current characteristic and a good ESR characteristic.

WORKING EXAMPLE 4

Solid electrolytic capacitor samples #16 to #20 each including ten samples were manufactured in the same manner as that in Working Example 1 except that a ceric sulfate aqueous solution of 15% by weight was used.

When each of the solid electrolytic capacitor samples #16 to #20 was manufactured, the time during which the anodic electrode was immersed in the oxidizing agent solution per time was set at fifteen (15) seconds, twenty five (25) seconds, one minute, 5 minutes and ten (10) minutes, respectively.

The electrical characteristics of the thus manufactured solid electrolytic capacitor samples #16 to #20 were assessed in the same manner as that in Working Example 1.

The results of assessing the electrical characteristics of the solid electrolytic capacitor samples #16 to #20 are shown in Table 4. Each of numerical values shown in Table 3 is the average value of the electrical characteristic for ten solid electrolytic capacitor samples.

a low leakage current characteristic cannot be manufactured even if the total time during which the anodic electrode is immersed in the oxidizing agent solution is kept to be shorter than five minutes.

WORKING EXAMPLE 5

The elements contained in the poly (3,4-ethylene dioxythiophene) forming the solid high molecular polymer electrolyte layer of each of the solid electrolytic capacitor samples #1, #2, #6 and #12 were analyzed using a fluorescent X-ray analyzing method. Analysis was conducted using a "3270" fluorescent X-ray analyzing apparatus manufactured by Rigaku International Corporation under the conditions of 50 kV–50 mA and 15 mmΦ.

As a result of analysis, the presence of cerium was confirmed and the cerium contents were those shown in Table 5 for each of the solid electrolytic capacitor samples #1, #2, #6 and #12.

TABLE 5

| Sample # | Cerium content ($\mu g/cm^2$) |
|---|---|
| #1 | 54.0 |
| #2 | 64.5 |
| #6 | 10.2 |
| #7 | 148.9 |

It is demonstrated by Table 5 that a solid electrolytic capacitor whose solid electrolyte layer contains cerium in an amount of 10 $\mu g/cm^2$ to 150 $\mu g/cm^2$ has excellent electric characteristics.

The present invention has thus been shown and described with reference to specific embodiments. However, it should be noted that the present invention is in no way limited to the details of the described arrangements but changes and modifications may be made without departing from the scope of the appended claims.

For example, in the above described embodiment and working examples, although the anodic electrode is

TABLE 4

| | | | | Average values | | |
|---|---|---|---|---|---|---|
| Sample # | Number of samples | Polymerization time per time (min) | Number of polymerizations | Total contact time with oxidizing agent (min) | Electrostatic capacity (120 Hz) [$\mu F$] | ESR (100 kHz) [m$\Omega$] | Leakage current (6.3 V, 5 min) [$\mu A$] |
| #16 | 10 | 0.25 | 10 times | 2.5 | 187.4 | 40.8 | 468 |
| #17 | 10 | 0.42 | 10 times | 4.2 | 183.9 | 39.9 | 537 |
| #18 | 10 | 1 | 10 times | 10.0 | 185.3 | 43.8 | 1635 |
| #19 | 10 | 5 | 10 times | 50 | 183.8 | 39.3 | 4989 |
| #20 | 10 | 10 | 10 times | 100 | 189.7 | 44.5 | 12260 |

As shown in Table 4, the leakage current value of each of the solid electrolytic capacitor samples #16 to #20 was high and it was observed that the leakage current characteristic of each was degraded. It can be considered that this is because a ceric sulfate aqueous solution having the concentration of 15% by weight higher, than that of the ceric sulfate aqueous solution used in Working Example 1, was used and, therefore, damage to the anodic electrode progressed.

Therefore, it was demonstrated that in the case where a ceric sulfate aqueous solution having the concentration of 15% by weight is used, a solid electrolytic capacitor having immersed in the oxidizing agent solution, it is sufficient for the oxidizing agent solution to be brought into contact with the anodic electrode and it is not absolutely necessary to immerse the anodic electrode in the oxidizing agent solution. The oxidizing agent solution may be brought into contact with the anodic electrode by spraying the oxidizing agent solution onto the anodic electrode by the spray coating method.

Further, in the above described embodiment and working examples, the anodic electrode is formed by connecting one end portion region of the foil-like aluminum substrate 3 whose surface is not roughened to one end portion region of the foil-like aluminum substrate 2 whose surface is roughened and which is formed with the aluminum oxide film on the surface thereof, thereby electrically connecting them and connecting one end portion region of the foil-like copper substrate 4 to the other end portion region of the foil-like aluminum substrate 3 whose surface is not roughened, thereby electrically connecting them, and the solid high molecular polymer electrolyte layer comprising polyethylene dioxythiophene is then formed on the surface of the foil-like aluminum substrate 2 formed with the aluminum oxide film by chemical oxidization polymerization. However, it is possible to form the solid high molecular polymer electrolyte layer comprising polyethylene dioxythiophene on the surface of the foil-like aluminum substrate 2 formed with the aluminum oxide film by chemical oxidization polymerization and then form the anodic electrode by connecting one end portion region of the foil-like aluminum substrate 3 whose surface is not roughened to one end portion region of the foil-like aluminum substrate 2 whose surface is roughened and which is formed with the aluminum oxide film on the surface thereof, thereby electrically connecting them and connecting one end portion region of the foil-like copper substrate 4 to the other end portion region of the foil-like aluminum substrate 3 whose surface is not roughened, thereby electrically connecting them.

Furthermore, in the above described embodiment, although the aluminum substrate is used as the valve metal substrate 2, 3, the valve metal substrate 2, 3 may be formed of aluminum alloy, or tantalum, titanium, niobium, zirconium or alloy thereof instead of aluminum.

Moreover, in the above described embodiment, although the foil-like copper substrate is used as a metal conductor for constituting a lead electrode, the metal conductor may be formed of copper alloy, or brass, nickel, zinc, chromium or alloy thereof instead of copper.

Further, in the above described embodiment, the foil-like aluminum substrate 2 whose surface is roughened and the foil-like aluminum substrate 3 whose surface is not roughened are connected by ultrasonic welding and the foil-like aluminum substrate 3 whose surface is not roughened and the foil-like copper substrate 4 are connected by ultrasonic welding. However, both connected portions or one of them may be formed by cold welding instead of ultrasonic welding.

Furthermore, in the above described embodiment, although the solid electrolytic capacitor 10 including the anodic electrode formed by connecting the foil-like aluminum substrate 3 whose surface is not roughened to one end portion region of the foil-like aluminum substrate 2 whose surface is roughened and which is formed with the aluminum oxide film on the surface thereof, the foil-like aluminum substrate 3 whose surface is not roughened and the foil-like copper substrate 4, it is possible to use a solid electrolytic capacitor including an anodic electrode having a different structure such as an anodic electrode including the foil-like aluminum substrate 2 which is formed with an aluminum oxide film on the surface thereof and whose surface is roughened and a foil-like conductive metal substrate.

According to the present invention, it is possible to provide a solid electrolytic capacitor having an excellent leakage current characteristic and a method for manufacturing a solid electrolytic capacitor which can produce a solid high molecular polymer electrolyte layer comprising polyethylene dioxythiophene under a normal temperature and in a short time without damaging a valve metal substrate constituting an electrode and produce a solid electrolytic capacitor whose leakage current is low.

What is claimed is:

1. A solid electrolytic capacitor including a solid high molecular polymer electrolyte layer comprising polyethylene dioxythiophene formed on a surface of a valve metal which is roughened and formed with an insulating oxide film, cerium being contained in the solid high molecular polymer electrolyte layer in an amount of $10\ \mu g/cm^2$ to $210\ \mu g/cm^2$.

2. A solid electrolytic capacitor in accordance with claim 1, wherein the cerium is contained in the solid high molecular polymer electrolyte layer in an amount of $10\ \mu g/cm^2$ to $150\ \mu g/cm^2$.

3. A solid electrolytic capacitor in accordance with claim 2, wherein a conductive layer is formed on the solid high molecular polymer electrolyte layer.

4. A solid electrolytic capacitor in accordance with claim 1, wherein a conductive layer is formed on the solid high molecular polymer electrolyte layer.

5. An electrolytic capacitor comprising:

a valve metal substrate;

an insulating film on the valve metal substrate;

a molecular polymer electrolyte layer composed of polyethylene dioxythiophene positioned over the insulating film and supported by the valve metal substrate, the molecular polymer electrolyte layer having cerium therein.

6. The capacitor according to claim 5, wherein the valve metal substrate has a roughened surface.

7. The capacitor according to claim 5, wherein the cerium has a concentration in the range of 10 to 210 $\mu g/cm2$.

8. A solid electrolytic capacitor comprising:

a solid, high molecular polymer electrolyte layer positioned on the surface of a roughened valve metal substrate; and cerium within the polymer.

* * * * *